Patented Apr. 24, 1945

2,374,470

UNITED STATES PATENT OFFICE 2,374,470

PREPARATION OF HIGHLY POTENT VITAMIN CONCENTRATES

Loran O. Buxton, Belleville, N. J., assignor to National Oil Products Company, Harrison, N. J., a corporation of New Jersey No Drawing. Application September 12, 1941, Serial No. 410,579

11 Claims. (Cl. 260—397.2)

This invention relates in general to the preparation of vitamin concentrates, and more particularly to the preparation of highly potent concentrates of vitamin A and highly potent concentrates of vitamin D from fish liver and other marine oils.

It is well known that the fish liver and other marine oils constitute the richest natural sources of vitamins A and D. For some time it has been a common practice to saponify these oils and to separate the unsaponifiable material from the resulting soap by extraction with a suitable solvent such as heptane, ethylene dichloride, etc. The unsaponifiable fraction thus obtained contains the vitamins A and/or D in their saponified form, i. e. alcoholic form. In most cases this unsaponifiable fraction contains relatively large quantities of biologically inactive materials, many of which have a rather objectionable odor and taste, and which are so similar to vitamins A and D in their solubility characteristics and molecular weight that they can be separated from the vitamins only with extreme difficulty. At the present time there is no practical commercial method for effecting a satisfactory separation of these constituents from the vitamins. Moreover, there has hitherto been no commercially practical method for separating the vitamin A from the vitamin D. It has been proposed to separate these two vitamins from each other by a large number of successive fractional crystallizations. However, such a method, although it will give fairly satisfactory results on a laboratory scale, is not feasible for commercial practice as it is too costly, complicated and time-consuming.

It is the object of this invention to provide a relatively simple and efficient process for preparing highly potent concentrates of vitamin A and highly potent concentrates of vitamin D from fish and fish liver oils.

A further object of this invention is to provide a commercially practicable, efficient process for the treatment of the unsaponifiable portion of fish liver and other marine oils to separate the vitamins contained therein from the non-vitamin materials.

Another object of this invention is to provide a commercially practicable, efficient process for the treatment of vitamin A and D-containing materials to recover the vitamins A and D individually.

Other objects of the invention will in part be obvious and will in part appear hereinafter.

The foregoing and other objects of the invention may be realized by subjecting the unsaponifiable fraction of a fish or fish liver oil to the action of a suitable acylating agent in such a manner that only the vitamin A alcohols present are esterified to the substantial exclusion of the vitamin D alcohols present. This esterification reaction may be controlled by supplying only the stoichiometrical quantity of the acylating agent to accomplish the foregoing results, or if an excess quantity of the acylating agent is used, the reaction is arrested at the proper point to prevent any substantial esterification of the vitamin D. Vitamin A, which is a primary alcohol, is more reactive towards esterification than the vitamin D which is a secondary alcohol; consequently selective esterification can be effected as outlined above. Upon completion of the esterification procedure the mass is dissolved in a hydrocarbon solvent and this solution then extracted with a solvent which is characterized by being miscible with the esterified constituents and immiscible with the hydrocarbon solvent and the unesterified components. After the vitamin A esters are removed, the residual hydrocarbon solution is again extracted with a second solvent which is immiscible with the hydrocarbon solvent and inactive hydrocarbon materials, such as squalene, which are present in the unsaponifiable material, but which will preferentially extract the vitamin D. The solvent containing the vitamin A esters is removed from the vitamin A esters and the residue saponified, and the vitamin A alcohols removed from the saponified mass by extraction with a suitable solvent. If desired, the saponification may be carried out before removing the solvent as in some cases the vitamin A may be more readily extracted if this is done. The reason for saponifying the vitamin A esters and thus converting them to their alcoholic form is that the vitamin esters produced during the esterification step are biologically inactive. The solvent is also removed from the solution containing the vitamin D and the residue is treated in the same manner as was the residue containing the vitamin A esters in order to reactivate any vitamin D that may have been esterified. However, if the process is properly carried out, very little or none of the vitamin D will be esterified, and, if desired, the saponification of the vitamin D residue may well be omitted. In either case a very highly potent vitamin D concentrate is obtained, which contains a relatively small quantity, if any, of vitamin A. The vitamin A concentrate will contain little or no vitamin D and only a very small amount of inactive material. The above procedure may be modified slightly by esterifying the vitamin D after the vitamin A esters have been removed and before the vitamin D is removed from the hydrocarbons such as squalene. The vitamin D esters may then be saponified as in the case of the vitamin A esters.

The invention accordingly comprises the several steps and the relation of one or more of such steps with respect to each of the others thereof, which will be exemplified in the process hereinafter disclosed, and the scope of the invention will be indicated in the claims.

In carrying out the process of the invention, it is preferred to start with an unsaponifiable fraction which is substantially devoid of cholesterol and other relatively high melting sterols. The procedure for removing cholesterol is well known and is usually effected by dissolving the vitamin fraction in a solvent and lowering the temperature of the solution to freeze out the cholesterol. The removal of cholesterol, the esterification of the vitamin A, and the extraction of the vitamin A esters and vitamin D may all be carried out in the same solvent vehicle. A few of the solvents which may be so used are the aliphatic and alicyclic hydrocarbons, including, among others, pentane, hexane, heptane, octane, nonane, etc., petroleum ether, cyclohexane, methyl cyclohexane, etc., as well as compatible mixtures of these and/or other suitable solvents.

Usually it is preferred to use several different solvents in carrying out the complete process; thus in removing the cholesterol, it is preferred to dissolve the unsaponifiable material in methanol as it is one of the most efficient solvents for that purpose. At temperatures substantially below room temperature, i. e. $-20°$ C. or lower, cholesterol is quite insoluble in methanol and precipitates out from the solution, whereas vitamin A and vitamin D are quite soluble. Since methanol is not a suitable medium in which to carry out the esterification step, it is removed in a suitable way, e. g. vacuum distillation, and the residue redissolved in another solvent which will be a suitable medium for the esterification procedure. Other solvents which may well be used in place of methanol are ethanol, isopropanol, methyl acetate, ethyl acetate, methyl formate, ethyl formate, etc. Solvent vehicles which are suitable for the esterification step include, inter alia, pyridine, benzene, petroleum ether, heptane, hexane, pentane, octane, nonane, cyclohexane, methyl cyclohexane, etc., and compatible mixtures of these and/or other suitable solvents. Preferably, an esterification catalyst is added to the solution in order to accelerate this reaction. If pyridine is used as the solvent vehicle it is not necessary to add an esterification catalyst as pyridine itself functions as a catalyst. In fact in some cases where a solvent other than pyridine is used, pyridine is preferably added as the esterification catalyst. Other compounds in addition to or in lieu of pyridine may be used as esterification catalysts, such as quinoline, piperidine, etc. Usually if either pyridine or benzene is used as the esterification medium, it is removed from the reaction mixture and the mixture dissolved in another solvent before proceeding with the extraction step. If benzene has been used it may easily be removed by a convenient method such as vacuum distillation and the residue then dissolved in the solvent in which it is desired to carry out the extraction step. In the case of pyridine, quinoline, piperidine, etc. it is preferable to dissolve the mass in the solvent in which it is desired to carry out the subsequent extraction step and remove the nitrogeneous compound by washing the whole mixture with a suitable solvent, such as acidified 50% methanol, after which the selective extraction of the vitamin A esters and vitamin D is carried out. Solvents suitable as extraction media include, inter alia, heptane, octane, nonane, hexane, pentane, petroleum ether, cyclohexane, methyl cyclohexane, etc.

Various acylating agents may be used in carrying out the esterification step in the process of my invention; among those which have been found to be useful are aromatic anhydrides, such as benzoic anhydride, phthalic anhydride, and naphthalic anhydride, aromatic acyl halides such as benzoyl chloride and substituted benzoyl chlorides and anhydrides and acyl halides of aliphatic dicarboxylic acids such as adipic anhydride, sebacic anhydride, succinic anhydride, adipyl chloride, sebacyl chloride and succinyl chloride. It is to be understood, however, that the invention is not limited to these esterifying agents as any acylating agent or compatible mixture of such agents which will produce vitamin A esters which may be selectively extracted out from a hydrocarbon solvent solution containing vitamin D alcohols and hydrocarbons such as squalene may be used.

It is preferred to use an amount of acylating agent somewhat in excess of the stoichiometrical quantity necessary to esterify all of the vitamin A, and then to arrest the reaction when all of the vitamin A has been esterified and before any or only very little of the vitamin D has been esterified. However, if desired, only the stoichiometrical amount of the acylating agent necessary to esterify the vitamin A may be added, and the reaction allowed to proceed to equilibrium. It is somewhat more difficult to determine the exact amount of acylating agent to use in order to obtain the desired results than it is to determine just when to arrest the reaction when an excess amount of esterifying agent is used under uniform conditions.

The esterification process may very well be carried out at room temperature and if it is desired to accelerate this reaction, it may be carried out at slightly elevated temperatures. It is desirable to use uniform conditions of temperature, reagents, etc. as it must be determined experimentally just when to arrest the reaction. Naturally, therefore, the best results will be obtained when the process is consistently carried out in a uniform manner.

When the esterification reaction has reached the proper point it may be arrested in any suitable manner. If an esterification catalyst has been used, it may be readily removed by washing the reaction mixture with an acidified methanol solution. It is preferred to use about a 50% methanol solution containing about 5% acetic acid. Besides thus removing the esterification catalyst, a large part of the acylating agent will also be removed and the esterification reaction for all practical purposes will be concluded. As it is preferred not to use benzene or pyridine as solvents in which to carry out the extraction step, if they have been used as the esterifying medium they may be removed as described hereinabove, and the residue redissolved in another solvent as previously described.

The extraction of the partially esterified mass is preferably carried out in an aliphatic or alicyclic hydrocarbon solvent vehicle such as heptane, octane, nonane, hexane, pentane, petroleum ether, cyclohexane, methyl cyclohexane, and the like. Also compatible mixtures of these and/or other suitable solvents may be used. The extracting agent is preferably an aqueous solution of a solvent such as methanol, ethanol, isopropanol, diacetone alcohol, other alcohols, and acetic acid, the percentage of water in each solvent being predetermined to yield the desired extractive powers with respect to the vitamin A and D components, respectively. In order to selectively extract first the vitamin A esters and then the vitamin D, varying strength solutions of the above solvents are used, e. g. to extract the vitamin A esters, about a 90% methanol solution may be used, and then to extract the vitamin D about a 95% methanol solution may be used. When acetic acid is used it has been found that solutions containing about 83% acetic acid will extract the vitamin A esters and 90% will extract the vitamin D. If desired, one solvent may be used for the first series of extractions and a different solvent used for the second series. The number of extractions to be carried out in each case will depend generally upon the type of solvents used, the amount of material to be extracted, the temperature at which the extracting is done, the type of material being extracted, etc. Either a continuous or a successive extraction process may be used. In some cases the extraction medium and extracting agent may be slightly soluble in each other. If so, it is preferred that they be saturated with each other before being used since better results will usually be obtained by so doing. Extracting agents other than those mentioned above may be used; the principal prerequisites being that such an agent be immiscible, or relatively so, with respect to the extraction medium, and that it will selectively extract the constituent or constituents desired.

The extraction steps may be carried out at room temperature; however, in some instances it may be preferred to extract at a temperature substantially below room temperature, since more efficient results will usually be obtained and fewer extractions will be required.

When a dicarboxylic anhydride is used as the acylating agent, it may be desirable to treat the reaction mixture with an alkali metal compound before the vitamin A esters are extracted therefrom. The reason that it may be desirable to do this is because in the process of esterification there may be produced on the anhydride, one free carboxyl group which is not esterified and by treating the reaction mixture with an alkali metal compound, such free carboxyl groups will be neutralized and alkali metal salts of the vitamin A esters produced. Such salts are usually more soluble in the solvents which are used to extract the vitamin A esters than are the salt-free esters. Thus, for example, 80% to 85% methanol may be used to extract the alkali metal salts of the vitamin A esters, whereas to extract the esters as such, 90% methanol should be used. Thus a better separation of the esterified material from the unesterified material may be obtained as the unesterified material is much less soluble in the less concentrated solvents. Naturally only enough of the alkali metal compounds to neutralize the free carboxyl group should be used, as an excess will serve to split the esters.

As the vitamin A esters produced are biologically inactive, they must be saponified to convert the same to their alcohol form. The vitamins are then extracted from the saponified mass with a suitable solvent, such as ethylene dichloride, petroleum ether, sulfuric ether, etc.

For a fuller understanding of the nature and objects of the invention, reference should be had to the following examples which are given merely to further illustrate the invention and are not to be construed in a limiting sense, all parts given being by weight.

*Example I*

10 parts of phthalic anhydrid were dissolved in 50 parts of pyridine and 20 parts of the unsaponifiable fraction of cod liver oil previously freed of cholesterol and containing 130,000 U. S. P. units vitamin D/gm. and 380,000 U. S. P. units vitamin A/gm. were added. The mixture was left to stand in the dark with occasional shaking at room temperature for two hours. 300 parts of petroleum ether were added and the pyridine removed by washing with 50% methanol containing 5% acetic acid. The petroleum ether fraction was thereafter washed twice with 70% methanol. The same was extracted with fifteen 200 part portions of 90% methanol. The 90% methanol extracts were combined and the solvent removed, thus yielding a residue containing the major portion of the vitamin A and other primary alcohols and a small percentage of vitamin D and hydrocarbons. The petroleum ether fraction was extracted with fifteen 150 part portions of 95% methanol. After these extractions the petroleum ether fraction consisted chiefly of hydrocarbons and a relatively small amount of vitamin A and vitamin D. The combined 95% methanol fractions contained the major portion of the vitamin D present in the original unsaponifiable fraction.

The vitamin D fraction after being freed of methanol was saponified by adding 9 parts of 5% methanolic KOH to 1 part of the fraction and refluxing for about 20 minutes. The saponified mass was cooled to room temperature and 18 parts of water added. The mass was then extracted three times with petroleum ether, and the petroleum ether extracts combined and washed once without shaking with an equal volume of water. The solution was then washed once with thorough shaking with one-half the volume of 3% aqueous KOH, then three times with the same volume of water without shaking, and finally three times with water with shaking. The washings were discarded. The residue which was obtained on removing the petroleum ether from the vitamin D fraction contained 1,200,000 U. S. P. units of vitamin D per gram.

The vitamin A fraction was saponified and extracted as described in connection with the vitamin D fraction, thereby yielding a vitamin A fraction having a potency of 1,180,000 U. S. P. units of vitamin A/gm.

*Example II*

Another sample of the same cod liver oil concentrate was treated much the same as in the above example, except that benzene was used as the medium in which to carry out the esterification instead of pyridine, and with the further exception that the acylating agent was permitted to react for a period of three days in lieu of two hours. The resulting concentrates which were obtained were much more potent than the original concentrate. The resulting vitamin D concentrate contained over 900,000 units of vitamin D/gm. and the vitamin A concentrate contained 850,000 units vitamin A/gm.

*Example III*

A cod liver oil concentrate containing about 100,000 units of vitamin D/gm. and 410,000 units of vitamin A/gm. was treated much the same as in Example I except that benzoic anhydride was used in place of phthalic anhydride as the acylating agent. Results comparable to those of Examples I and II were obtained.

As aforementioned, the process of the invention may be modified by esterifying the vitamin D subsequent to the removal of the vitamin A esters. The same acylating agents, catalysts, conditions, etc. may be employed in esterifynig the vitamin D as is used in esterifying the vitamin A. Likewise when an anhydride of a dicarboxylic acid is used as the acylating agent, the alkali metal salt may be formed of the vitamin D ester in the same manner as disclosed with respect to the vitamin A esters. Moreover, the same type of solvents may be employed in removing the vitamin D esters from the hydrocarbons, such as squalene, as is used in extracting the unesterified vitamin D.

The process of this invention may be used to prepare concentrates of vitamin A and concentrates of vitamin D from any material containing both vitamins A and D. It is particularly directed to the treating of the unsaponifiable portion of fish liver oils and other marine oils, such as are obtained from cod, halibut, herring, sardine, tuna, swordfish, shark, ling cod, jew fish, blue whale, pollack, mackerel, etc.

The highly potent vitamin A and vitamin D concentrates produced by the process of my invention may be used for the same purposes for which ordinary concentrates are adapted. They may be used for pharmaceutical purposes, for fortifying foods, or any other similar purpose. Varying amounts of the vitamin A concentrate and of the vitamin D concentrate may be admixed with each other to obtain products containing any ratio of vitamin A to vitamin D desired. Likewise the vitamin A concentrate may be admixed with synthetic forms of vitamin D, such as activated ergosterol, cholesterol, 7-dehydro cholesterol, etc.

Although the unsaponifiable matter may be obtained from the oils in any usual way, it is preferred to use either the process disclosed and claimed in copending application of Buxton and Simons, Serial No. 333,114, filed May 3, 1940, now Patent No. 2,318,748, or the process disclosed and claimed in copending application of Buxton and Colman, Serial No. 350,166, filed August 2, 1940, now Patent No. 2,318,749.

The unsaponifiable fraction of certain fish and fish liver oils contains various primary alcohols other than vitamin A. For example, such fractions derived from cod liver oil contain batyl, chimyl and selachyl alcohols which will react with the acylating agents employed in the process of the invention; consequently these primary alcohols will be esterified and extracted out with the vitamin A. On saponification of the vitamin A ester and subsequent extraction of the alcoholic form of vitamin, certain of the alcohols and particularly batyl alcohol will remain in the residue and thus be separated from the vitamin A.

The expressions "units of vitamin A" and "units of vitamin D" as used hereinabove refer to the U. S. P. units of the said vitamins.

For the sake of brevity the expression "vitamin concentrate" is used in the appended claims to connote the unsaponifiable fraction of a fish or fish liver oil produced by saponification procedures. The expression "aliphatic hydrocarbon solvent" is employed in the appended claims to connote straight chain, branched chain and/or alicyclic hydrocarbon solvents.

Since certain changes may be made in carrying out the above process without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described my invention what I claim as new and desire to secure by Letters Patent is:

1. A process of treating a vitamin A and D concentrate to separate vitamin A from vitamin D, which comprises esterifying vitamin A to the substantial exclusion of the vitamin D with an acylating agent selected from the group consisting of the anhydrides and acyl halides of aromatic acids and aliphatic dicarboxylic acids and extracting an aliphatic hydrocarbon solvent solution of the reaction mass with an aqueous solution of a water-miscible organic solvent to selectively remove esterified vitamin A.

2. A process of treating a vitamin A and D concentrate to separate vitamin A from vitamin D, which comprises esterifying vitamin A to the substantial exclusion of the vitamin D with an acylating agent selected from the group consisting of the anhydrides and acyl halides of aromatic acids and aliphatic dicarboxylic acids and extracting an aliphatic hydrocarbon solvent solution of the reaction mass with a lower aliphatic alcohol containing more than 5% moisture to selectively remove esterified vitamin A.

3. A process of treating a vitamin A and D concentrate to separate vitamin A from vitamin D, which comprises esterifying vitamin A to the substantial exclusion of the vitamin D with an acylating agent selected from the group consisting of the anhydrides and acyl halides of aromatic acids and aliphatic dicarboxylic acids, extracting an aliphatic hydrocarbon solvent solution of the reaction mass with a lower aliphatic alcohol containing more than 5% moisture to selectively remove esterified vitamin A, and removing vitamin D from the residual mass by extraction with a lower aliphatic alcohol containing no more than 5% moisture.

4. A process of treating a vitamin A and D concentrate to separate vitamin A from vitamin D, which comprises esterifying vitamin A to the substantial exclusion of the vitamin D, in the presence of pyridine, with an acylating agent selected from the group consisting of the anhydrides and acyl halides of aromatic acids and aliphatic dicarboxylic acids, extracting an aliphatic hydrocarbon solvent solution of the reaction mass with a lower aliphatic alcohol containing more than 5% moisture to selectively remove esterified vitamin A, and removing vitamin D from the residual mass by extraction with a lower aliphatic alcohol containing no more than 5% moisture.

5. A process of treating a vitamin A and D concentrate to separate vitamin A from vitamin D, which comprises esterifying vitamin A to the substantial exclusion of the vitamin D with an acylating agent selected from the group consisting of the anhydrides and acyl halides of aromatic acids and aliphatic dicarboxylic acids, extracting an aliphatic hydrocarbon solvent solution of the reaction mass with 85% to 94% methanol to selectively remove esterified vitamin A, and removing vitamin D from the residual mass by extraction with a lower aliphatic alcohol containing no more than 5% moisture.

6. A process of treating a vitamin A and D concentrate to separate vitamin A from vitamin D, which comprises esterifying vitamin A to the substantial exclusion of the vitamin D, in the presence of pyridine, with an acylating agent selected from the group consisting of the anhydrides and acyl halides of aromatic acids and aliphatic dicarboxylic acids, extracting an aliphatic hydrocarbon solvent solution of the reaction mass with 85% to 94% methanol to selectively remove esterified vitamin A, and removing vitamin D from the residual mass by extraction with a lower aliphatic alcohol containing no more than 5% moisture.

7. A process of treating a vitamin A and D concentrate to separate vitamin A from vitamin D, which comprises esterifying vitamin A to the substantial exclusion of vitamin D with phthalic anhydride in the presence of pyridine, removing the pyridine, extracting an aliphatic hydrocarbon solution of the partially esterified mass with 85% to 94% methanol to remove the esterified vitamin A, and removing the vitamin D from the residual mass by extraction with 95% to 100% methanol.

8. A process of treating a vitamin A and D concentrate to separate vitamin A from vitamin D, which comprises esterifying vitamin A to the substantial exclusion of vitamin D with benzoyl chloride in the presence of pyridine, removing the pyridine, extracting an aliphatic hydrocarbon solution of the partially esterified mass with 85% to 94% methanol to remove the esterified vitamin A, and removing the vitamin D from the residual mass by extraction with 95% to 100% methanol.

9. A process of treating a vitamin A and D concentrate to separate vitamin A from vitamin D, which comprises esterifying vitamin A to the substantial exclusion of vitamin D with phthalic anhydride in the presence of pyridine, removing the pyridine, extracting a heptane solution of the partially esterified mass with 85% to 94% methanol to remove the esterified vitamin A, and removing the vitamin D from the residual mass by extraction with 95% to 100% methanol.

10. A process of treating a vitamin A and D concentrate to separate vitamin A from vitamin D, which comprises esterifying vitamin A to the substantial exclusion of vitamin D with phthalic anhydride in the presence of pyridine, removing the pyridine, extracting a cyclohexane solution of the partially esterified mass with 85% to 94% methanol to remove the esterified vitamin A, and removing the vitamin D from the residual mass by extraction with 95% to 100% methanol.

11. A process of treating a vitamin A and D concentrate to separate vitamin A from vitamin D, which comprises esterifying vitamin A to the substantial exclusion of vitamin D with an anhydride of a dicarboxylic acid in the presence of pyridine, removing the pyridine, forming an alkali metal salt with the carboxyl groups remaining free in the vitamin A esters, extracting an aliphatic hydrocarbon solution of the partially esterfied mass with methanol containing more than 5% moisture to remove the esterified vitamin A, and removing vitamin D from the residual mass by extraction with methanol containing no more than 5% moisture.

LORAN O. BUXTON.